United States Patent [19]

Cheng et al.

[11] Patent Number: 5,545,788

[45] Date of Patent: * Aug. 13, 1996

[54] PROCESS FOR THE ALKYLATION OF BENZENE-RICH REFORMATE USING MCM-49

[75] Inventors: Jane C. Cheng, Clarksburg; Tracy J. Huang, Lawrenceville, both of N.J.

[73] Assignee: Mobil Oil Corporation, Fairfax, Va.

[*] Notice: The portion of the term of this patent subsequent to Jun. 16, 2013, has been disclaimed.

[21] Appl. No.: 350,308

[22] Filed: Dec. 6, 1994

Related U.S. Application Data

[63] Continuation-in-part of Ser. No. 78,369, Jun. 16, 1993, Pat. No. 5,371,310, which is a continuation-in-part of Ser. No. 802,938, Dec. 6, 1991, Pat. No. 5,236,575, which is a continuation-in-part of Ser. No. 717,436, Jun. 19, 1991, abandoned.

[51] Int. Cl.$^6$ ............................................. C07C 2/66
[52] U.S. Cl. ........................... 585/467; 585/446; 585/453
[58] Field of Search .................................. 585/446, 467, 585/453

[56] References Cited

U.S. PATENT DOCUMENTS

| | | | |
|---|---|---|---|
| 3,649,520 | 3/1972 | Graven | 208/93 |
| 3,767,568 | 10/1973 | Chen | 208/134 |
| 3,770,614 | 11/1973 | Graven | 208/62 |
| 4,469,908 | 9/1984 | Burress | 585/467 |
| 4,746,762 | 5/1988 | Avidan et al. | 585/415 |
| 4,827,069 | 5/1989 | Kushnerick et al. | 585/415 |
| 4,950,387 | 8/1990 | Harandi et al. | 208/49 |
| 4,954,325 | 9/1990 | Rubin et al. | 423/328 |
| 4,992,606 | 2/1991 | Kushnerick et al. | 585/467 |
| 4,992,607 | 2/1991 | Harandi et al. | 585/467 |
| 5,149,894 | 9/1992 | Holtermann et al. | 585/467 |
| 5,236,575 | 8/1993 | Bennett et al. | 208/46 |
| 5,329,059 | 7/1994 | Marler | 585/475 |
| 5,334,795 | 8/1994 | Le | 585/467 |
| 5,336,820 | 8/1994 | Owen et al. | 585/323 |
| 5,371,310 | 12/1994 | Bennett et al. | 585/467 |
| 5,401,896 | 3/1995 | Kuehl et al. | 585/467 |
| 5,453,554 | 9/1995 | Cheng et al. | 585/467 |
| 5,457,254 | 10/1995 | Ardito et al. | 585/455 |

*Primary Examiner*—Anthony McFarland
*Attorney, Agent, or Firm*—Ronald A. Bleeker; Malcolm D. Keen; Laurence P. Hobbes

[57] ABSTRACT

The present invention relates to a process for alkylating a reformate feedstream containing benzene, toluene, xylenes, and ethylbenzene, said process comprising:

1) contacting said reformate feedstream with a hydrocarbon stream comprising $C_2$–$C_5$ olefins in the presence of a catalyst comprising an active form of synthetic porous crystalline MCM-49 under benzene alkylation conditions whereby an effluent stream is produced having a benzene content at least 50 wt % less than that of said feedstream, an octane rating no less than that of said feedstream, and a total liquid product greater than that of said feedstream; and 2) collecting the gasoline boiling range fraction of said effluent stream.

15 Claims, 2 Drawing Sheets

PROCESS FOR THE ALKYLATION OF BENZENE-RICH REFORMATE USING MCM-49

CROSS-REFERENCE TO RELATED APPLICATIONS

This application is a continuation-in-part of U.S. patent application Ser. No. 08/078,369, filed Jun. 16, 1993, now U.S. Pat. No. 5,371,310, issued Dec. 6, 1994, which is a continuation-in-part of U.S. patent application Ser. No. 07/802,938, filed Dec. 6, 1991, now U.S. Pat. No. 5,236,575 which is a continuation-in-part of U.S. patent application Ser. No. 07/717,436, filed Jun. 19, 1991, now abandoned.

BACKGROUND OF THE INVENTION

Gasolines manufactured to contain a higher concentration of aromatics such as benzene, toluene and xylenes (BTX) can adequately meet the octane requirements of the marketplace for a high octane fuel. Aromatics, particularly benzene, are commonly produced in refinery processes such as catalytic reforming which have been a part of the conventional refinery complex for many years. However, their substitution for the environmentally unsuitable lead-based octane enhancers is complicated by environmental problems of benzene. Environmental and health related studies have raised serious questions regarding the human health effects of benzene. The findings suggest that exposure to high levels of benzene should be avoided with the result that benzene concentration in gasoline to enhance octane number is limited and controlled to a relatively low value.

When hydrocarbons boiling in the gasoline boiling range are reformed in the presence of a hydrogenation-dehydrogenation catalyst, a number of reactions take place which include dehydrogenation of naphthenes to form aromatics, dehydrocyclization of paraffins to form aromatics, isomerization reactions and hydrocracking reactions. The composition of the reformer effluent or reformate is shifted toward higher octane value product. Catalytic reforming primarily increases the octane of motor gasoline by aromatics formation but without increasing the yield of gasoline.

Reformates can be prepared by conventional techniques by contacting any suitable material such as a naphtha charge material boiling in the range of $C_5$ or $C_6$ up to about 380° F. (193° C.) with hydrogen in contact with any conventional reforming catalyst. Typical reforming operating conditions include temperatures in the range of from about 800° F. (427° C.) to about 1000° F. (538° C.), preferably from about 890 (477° C.) up to about 980° F. (527° C.), liquid hourly space velocity in the range of from about 0.1 to about 10, preferably from about 0.5 to about 5; a pressure in the range of from about atmospheric up to about 700 psig (4900 kPa) and higher, preferably from about 100 (700 kPa) to about 600 psig (4200 Kpa); and a hydrogen-hydrocarbon ratio in the charge in the range from about 0.5 to about 20 and preferably from about 1 to about 10.

The treatment of a reformate with crystalline aluminosilicate zeolites is known in the art and has included both physical treatments such as selective adsorption, as well as chemical treatments such as selective conversion thereof. In U.S. Pat. No. 3,770,614 to Graven a process combination is described for upgrading naphtha boiling range hydrocarbons by a combination of catalytic reforming and selective conversion of paraffinic components to enhance yield of aromatic hydrocarbons by contact with crystalline aluminosilicate catalyst having particular conversion characteristics. In U.S. Pat. No. 3,649,520 to Graven a process is described for the production of lead free gasoline by an integrated process of reforming, aromatics recovery and isomerization including C6 hydrocarbons upgrading to higher octane product for blending.

U.S. Pat. No. 3,767,568 to Chen, incorporated herein by reference, discloses a process for upgrading reformates and reformer effluents by contacting them with specific zeolite catalysts so as to sorb methyl paraffins at conversion conditions and alkylate a portion of aromatic rings contained in the reformates.

Recently, a process has been developed to overcome some of the foregoing challenges in the reformulation of gasoline. The process is known in the art as the Mobil Benzene Reduction (MBR) process and is closely related to the Mobil Olefins to Gasoline (MOG) process. The MBR and MOG processes are described in U.S. Pat. Nos. 4,827,069 to Kushnerick, 4,950,387 and 4,992,607 to Harandi, and 4,746,762 to Avidan, all of common assignee. These patents are incorporated herein by reference.

The MBR process is a fluid bed process which uses shape selective, metallosilicate catalyst particles, preferably ZSM-5, to convert benzene to alkylaromatics using olefins from sources such as FCC or coker fuel gas, excess LPG, light FCC naphtha or the like. Benzene is converted, and light olefin is also upgraded to gasoline concurrent with an increase in octane value. Conversion of light FCC naphtha olefins also leads to substantial reduction of gasoline olefin content and vapor pressure. The yield-octane uplift of MBR makes it one of the few gasoline reformulation processes that is actually economically beneficial in petroleum refining.

The MBR process as practiced has relied upon light olefin as alkylating agent for benzene to produce alkylaromatic, principally in the $C_7$–$C_9$ range. The light olefins generally preferred include $C_2$–$C_7$ olefins.

The MBR process using higher temperatures and intermediate pore size zeolite catalysts provides for adequate reduction in benzene to meet gasoline specifications. However, C5+ yields and octane ratings can be deleteriously affected. Accordingly, it would be desirable to provide a process for benzene reduction in reformate wherein octane number is retained with minimal or no cracking of C5+ non-aromatics, while increasing upgraded reformate yield.

U.S. Pat. No. 4,469,908 to Burress discloses aromatics alkylation with C2 to C5 olefins at low temperatures (100° to 300° C.) using medium pore size zeolites, e.g., ZSM-12.

U.S. Pat. No. 4,954,325 to Rubin et al discloses MCM-22 zeolite and its utility in alkylation of aromatic hydrocarbons with gaseous olefins to provide short chain alkyl aromatics, such as cumene. Disclosed reaction conditions range from 10° C. to 125° C.

U.S. Pat. No. 4,992,606 to Kushnerick et al, incorporated herein by reference, discloses the preparation of relatively short chain alkylaromatic compounds over MCM-22 zeolite at 0° to 500° C. Reformate containing benzene, toluene, and/or xylene is disclosed as a suitable feedstock (col. 4, 11.25 to 27). No mention of phase conditions is made.

U.S. Pat. No. 5,149,894 to Holtermann et al, incorporated herein by reference discloses a process for aromatics alkylation under at least partial liquid phase conditions comprising temperatures of 225° to 450° F, over SSZ-25 (MCM-22) catalyst.

U.S. Pat. No. 5,329,059 to Marler, incorporated herein by reference discloses a process for disproportionation of alkylaromatics over zeolite MCM-49 catalyst.

U.S. Pat. No. 5,334,795 to Chu et al, incorporated herein by reference discloses a process for the alkylation of benzene with ethylene at 300° to 1000° F. over zeolite MCM-22 catalyst.

U.S. Pat. No. 5,336,820 to Owen et al, incorporated herein by reference discloses a process for reducing benzene content in reformate by contacting with C2 to C7 olefin in the presence of a medium or large pore zeolites, including MCM-22, MCM-36, and MCM-49 at temperatures between 500° F. and 1000° F.

Parent application, Ser. No. 08/078,369, filed Jun. 16, 1993, now U.S. Pat. No. 5,371,310, discloses aromatics alkylation with olefins in the presence of MCM-49 re shortchain alkylation w/MCM-49 using a reformate feed.

The present invention relates to a process for the production of a more environmentally suitable gasoline by removing a substantial portion of benzene in gasoline by alkylation of reformate. More particularly, the invention relates to a method to improve the conversion of benzene relative to other aromatics in gasoline feedstreams by carrying out the alkylation process using a light olefin feed at low temperature over large pore zeolite catalyst, MCM-49.

SUMMARY

The present invention relates to a process for alkylating a benzene-containing feedstream, said process comprising:

contacting said feedstream with a hydrocarbon stream comprising $C_2$–$C_5$ olefins in the presence of a catalyst comprising an active form of synthetic porous crystalline MCM-49 under sufficient reaction conditions whereby an effluent stream is produced containing an alkylated benzene product.

Alternatively, there is provided a process for alkylating a reformate feedstream containing benzene, toluene, xylenes, and ethylbenzene, said process comprising:

1) contacting said reformate feedstream with a hydrocarbon stream comprising $C_2$–$C_5$ olefins in the presence of a catalyst comprising an active form of synthetic porous crystalline MCM-49 under benzene alkylation conditions comprising temperatures of 220° to 350° C., (428° to 662° F.), pressures of 50 to 1000 psig, a benzene to olefin molar ratio of 0.1 to 0.9, and an aromatics to olefin molar ratio of 0.1 to 10, whereby an effluent stream is produced having a benzene content at least 50 wt % less than that of said feedstream, an octane rating no less than that of said feedstream, and a total liquid product greater than that of said feedstream; and 2) collecting the gasoline boiling range fraction of said effluent stream. The collected gasoline boiling range fraction may then be blended with a non-reformate gasoline boiling range fraction to provide a gasoline boiling range product containing no greater than 1 wt % benzene.

Another embodiment of the present invention relates to a process for reducing benzene content in a benzene-containing full range reformate feed while enhancing octane number (RON) by at least 0.5 which comprises 1) contacting said feed with a hydrocarbon stream comprising $C_2$–$C_5$ olefins in the presence of a catalyst comprising an active form of synthetic porous crystalline MCM-49 under benzene alkylation conditions including a temperature ranging from 215° to 300° C.; and 2) collecting the gasoline boiling range fraction of said feedstream.

EMBODIMENTS

Figure 1:
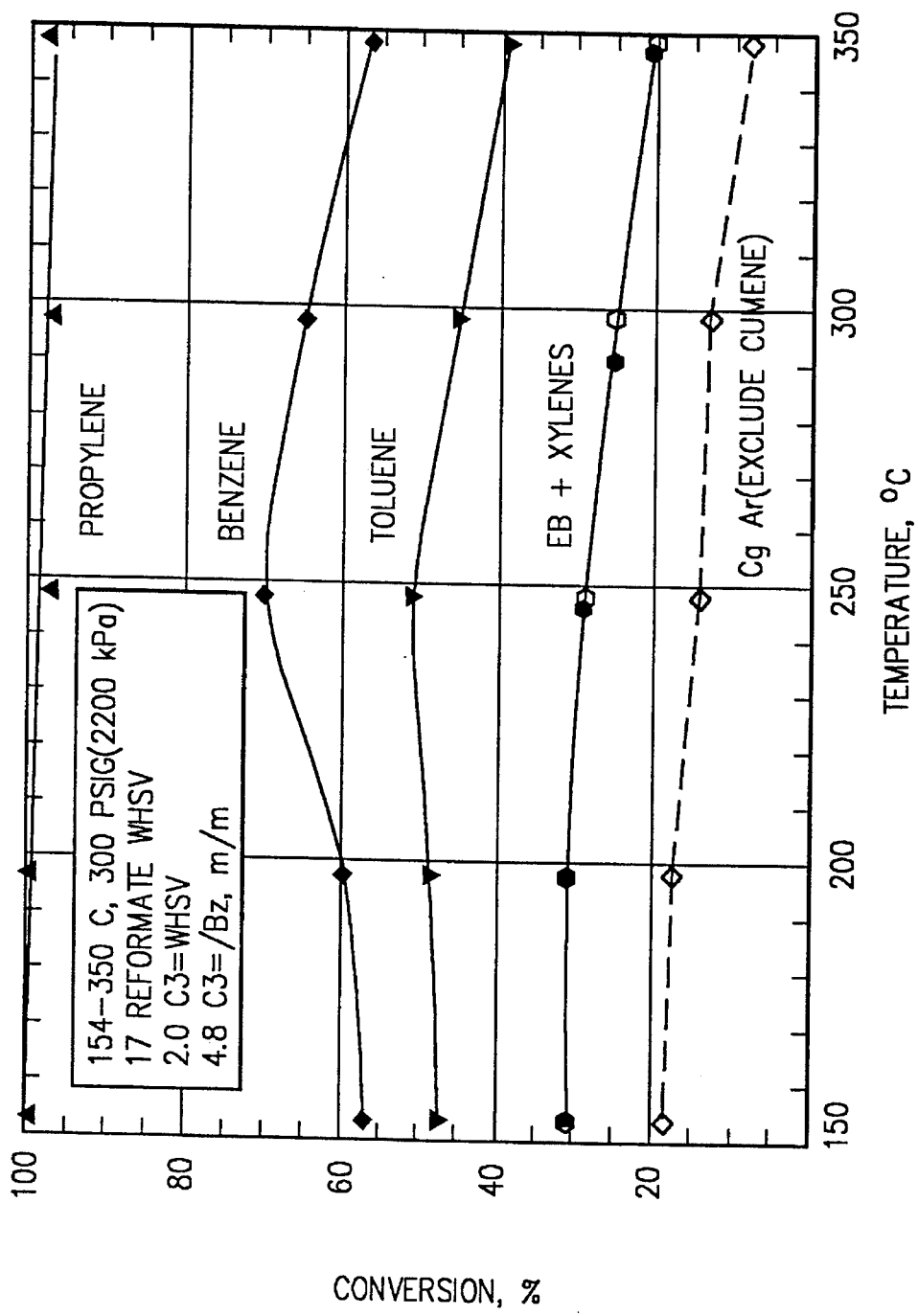
FIG. 1 depicts % conversion for benzene, toluene, ethylbenzene/xylenes, and C9 aromatics (excluding cumene) observed for alkylation of a full range reformate with propylene over MCM-49 in accordance with the present invention.

Reformates are suited to use for gasoline blending owing to their high octane number attributable to their high aromatics content. However, high concentrations of benzene in reformate, e.g., 4 to 6 wt %, can limit reformate utility as a blending component where environmental considerations require low benzene levels in gasoline product (no greater than 1 vol %). Various efforts to reduce benzene content in reformate, e.g., selective hydrogenation, high temperature fluid-bed MBR, and reformate alkylation with methanol all suffer from octane losses or total liquid product losses associated with undesired cracking of C5+ non-aromatics.

The present invention relates to a process whereby benzene-containing reformates are treated to reduce benzene content by alkylation while minimizing undesirable alkylation of higher boiling aromatics such as xylenes.

The catalyst employed in the present invention, MCM-49 is further described in U.S. Pat. Nos. 5,236,575, and 5,371,310, the entire contents of both being incorporated herein by reference.

Examples of suitable alkylating agents for use in the present invention are olefins such as ethylene, propylene, the butenes, and the pentenes. Mixtures of light olefins are especially useful as alkylating agents in the alkylation process of this invention. Accordingly, mixtures of ethylene, propylene, butenes, and/or pentenes which are major constituents of a variety of refinery streams, e.g., fuel gas, gas plant off-gas containing ethylene, propylene, etc., naphtha cracker off-gas containing light olefins, refinery FCC propane/propylene streams, and FCC off-gas, etc., are useful alkylating agents herein. For example, a typical FCC light olefin stream possesses the following composition:

|  | Wt. % | Mole % |
| --- | --- | --- |
| Ethane | 3.3 | 5.1 |
| Ethylene | 0.7 | 1.2 |
| Propane | 14.5 | 15.3 |
| Propylene | 42.5 | 46.8 |
| Isobutane | 12.9 | 10.3 |
| n-Butane | 3.3 | 2.6 |
| Butenes | 22.1 | 18.32 |
| Pentanes | 0.7 | 0.4 |

The term "aromatic" in reference to the alkylatable compounds which are useful herein is to be understood in accordance with its art-recognized scope which includes alkyl substituted and unsubstituted mono- and polynuclear compounds. Compounds of an aromatic character which possess a hetero atom are also useful provided they do not act as catalyst poisons under the reaction conditions selected.

Substituted aromatic compounds which can be alkylated herein must possess at least one hydrogen atom directly bonded to the aromatic nucleus. The aromatic rings can be substituted with one or more alkyl, aryl, alkaryl, alkoxy, aryloxy, cycloalkyl, halide, and/or other groups which do not interfere with the alkylation reaction.

Suitable aromatic hydrocarbons include benzene, naphthalene, anthracene, naphthacene, perylene, coronene, and phenanthrene.

Generally the alkyl groups which can be present as substituents on the aromatic compound contain from 1 to about 22 carbon atoms and usually from about 1 to 8 carbon atoms, and most usually from about 1 to 4 carbon atoms.

Suitable alkyl substituted aromatic compounds include toluene, xylene, isopropylbenzene, normal propylbenzene, alpha-methylnaphthalene, ethylbenzene, cumene, mesitylene, durene, p-cymene, butylbenzene, pseudocumene, o-diethylbenzene, m-diethylbenzene, p-diethylbenzene, isoamylbenzene, isohexylbenzene, pentaethylbenzene, pentamethylbenzene; 1,2,3,4-tetraethylbenzene; 1,2,3,4,5-tetramethylbenzene; 1,2,4-triethylbenzene; 1,2,3-trimethylbenzene, m-butyltoluene; p-butyltoluene; 3,5-diethyltoluene; o-ethyltoluene; p-ethyltoluene; m-propyltoluene; 4-ethyl-m-xylene; dimethylnaphthalenes; ethylnaphthalene; 2,3-dimethylanthracene; 9-ethylanthracene; 2-methylanthracene; o-methylanthracene; 9,10-dimethylphenanthrene; and 3-methyl-phenanthrene. Higher molecular weight alkylaromatic hydrocarbons can also be used as starting materials and include aromatic hydrocarbons such as are produced by the alkylation of aromatic hydrocarbons with olefin oligomers. Such product is frequently referred to in the art as alkylate and can include hexylbenzene, nonylbenzene, dodecylbenzene, pentadecylbenzene, hexyltoluene, nonyltoluene, dodecyltoluene, pentadecytoluene, etc.

Reformate containing substantial quantities of benzene, toluene and/or xylene constitutes a particularly useful feed for the alkylation process of this invention. Such reformates include light reformate (C5° to 250° F.) or full range reformate (C5 to 450° F.). The present invention is especially useful in treating full range reformates which can contain mono alkylaromatics or polyalkylaromatics which are ordinarily more readily alkylatable than benzene. The present invention selectively converts benzene to alkylbenzene while maintaining relatively low alkylaromatics or polyalkylaromatics conversion. Reaction products present in the product which may be obtained from the process of the invention include ethylbenzene from the reaction of benzene with ethylene, cumene from the reaction of benzene with propylene, ethyltoluene from the reaction of toluene with ethylene, and cymenes from the reaction of toluene with propylene.

The crystalline material MCM-49 for use as catalyst component in this invention may have a composition involving the molar relationship:

$$X_2O_3:(n)YO_2,$$

wherein X is a trivalent element, such as aluminum, boron, iron, and/or gallium, preferably aluminum; Y is a tetravalent element such as silicon, titanium, and/or germanium, preferably silicon; and n is less than about 35, e.g., from 2 to less than about 35, usually from about 10 to less than about 35, more usually from about 15 to about 31. In the assynthesized form, the material may have a formula, on an anhydrous basis and in terms of moles of oxides per n moles of $YO_2$, as follows:

$$(0.1–0.6)M_2O: (1–4)R:X_2O_3:nYO_2$$

wherein M is an alkali or alkaline earth metal, and R is an organic moiety. The M and R components are associated with the material as a result of their presence during crystallization, and are easily removed by post-crystallization methods hereinafter more particularly described.

MCM-49 is thermally stable and in the calcined form exhibits high surface area (greater than 400 m²/gm) and unusually large sorption capacity when compared to previously described materials such as calcined PSH-3 and SSZ-25 having similar X-ray diffraction patterns. To the extent desired, the original sodium cations of the as-synthesized material can be replaced in accordance with techniques well known in the art, at least in part, by ion exchange with other cations. Preferred replacing cations include metal ions, hydrogen ions, hydrogen precursor, e.g., ammonium, ions, and mixtures thereof. Particularly preferred cations are those which tailor the catalytic activity for certain hydrocarbon conversion reactions. These include hydrogen, rare earth metals, and metals of Groups IIA, IIIA, IVA, IB, IIB, IIIB, IVB and VIII of the Periodic Table of the Elements.

In the as-synthesized form, the crystalline MCM-49 material for use in the invention appears to be a single crystalline phase. It can be prepared in essentially pure form with little or no detectable impurity crystal phases and has an X-ray diffraction pattern which is distinguished from the patterns of other known as-synthesized or thermally treated crystalline materials by the lines listed in Table I below:

TABLE I

| Interplanar d-Spacing (A) | Relative Intensity, I/Io × 100 |
|---|---|
| 13.15 ± 0.26 | w-s* |
| 12.49 ± 0.24 | vs |
| 11.19 ± 0.22 | m-s |
| 6.43 ± 0.12 | w |
| 4.98 ± 0.10 | w |
| 4.69 ± 0.09 | w |
| 3.44 ± 0.07 | vs |
| 3.24 ± 0.06 | w |

*shoulder

The X-ray diffraction peak at 13.15±0.26 Angstrom Units (A) is usually not fully resolved for MCM-49 from the intense peak at 12.49±0.24, and is observed as a shoulder of this intense peak. For this reason, the precise intensity and position of the 13.15±0.26 Angstroms peak are difficult to determine within the stated range. In its calcined form, the crystalline MCM-49 material for use in the invention is a single crystal phase with little or no detectable impurity crystal phases having an X-ray diffraction pattern which is not easily distinguished from that of MCM-22, but is readily distinguishable from the patterns of other known crystalline materials. The X-ray diffraction pattern of the calcined form of MCM-49 includes the lines listed in Table II below:

TABLE II

| Interplanar d-Spacing (A) | Relative Intensity, I/Io × 100 |
|---|---|
| 12.41 ± 0.24 | vs |
| 11.10 ± 0.22 | s |
| 8.89 ± 0.17 | m-s |
| 6.89 ± 0.13 | w |
| 6.19 ± 0.12 | m |
| 6.01 ± 0.12 | w |
| 5.56 ± 0.11 | w |
| 4.96 ± 0.10 | w |
| 4.67 ± 0.09 | w |

TABLE II-continued

| Interplanar d-Spacing (A) | Relative Intensity, $I/I_o \times 100$ |
|---|---|
| 4.59 ± 0.09 | w |
| 4.39 ± 0.09 | w |
| 4.12 ± 0.08 | w |
| 4.07 ± 0.08 | w-m |
| 3.92 ± 0.08 | w-m |
| 3.75 ± 0.07 | w-m |
| 3.57 ± 0.07 | w |
| 3.43 ± 0.07 | s-vs |
| 3.31 ± 0.06 | w |
| 3.21 ± 0.06 | w |
| 3.12 ± 0.06 | w |
| 3.07 ± 0.06 | w |
| 2.83 ± 0.05 | w |
| 2.78 ± 0.05 | w |
| 2.69 ± 0.05 | w |
| 2.47 ± 0.05 | w |
| 2.42 ± 0.05 | w |
| 2.38 ± 0.05 | w |

The X-ray diffraction data used to formulate Tables I and II were collected with a Scintag diffraction system, equipped with a germanium solid state detector, using copper K-alpha radiation. The diffraction data were recorded by step-scanning at 0.02 degrees of two-theta, where theta is the Bragg angle, and a counting time of 10 seconds for each step. The interplanar spacings, d's, were calculated in Angstrom units (A), and the relative intensities of the lines, $I/I_o$ is one-hundredth of the intensity of the strongest line, above background, were derived with the use of a profile fitting routine (or second derivative algorithm). The intensities are uncorrected for Lorentz and polarization effects. The relative intensities are given in terms of the symbols vs=very strong (60–100), s=strong (40–60), m=medium (20–40) and w=weak (0–20). It should be understood that diffraction data given as single lines may consist of multiple overlapping lines which under certain conditions, such as differences in crystallographic changes, may appear as resolved or partially resolved lines. Typically, crystallographic changes can include minor changes in unit cell parameters and/or a change in crystal symmetry, without a change in the structure. These minor effects, including changes in relative intensities, can also occur as a result of differences in cation content, framework composition, nature, and degree of pore filling, and thermal and/or hydrothermal history.

MCM-49 can be prepared from a reaction mixture containing sources of alkali or alkaline earth metal (M), e.g. sodium or potassium, cation, an oxide of trivalent element X, e.g. aluminum, an oxide of tetravalent element Y, e.g. silicon, directing agent (R), and water, said reaction mixture having a composition, in terms of mole ratios of oxides, within the following ranges:

| Reactants | Useful | Preferred |
|---|---|---|
| $YO_2/X_2O_3$ | 12 to <35 | 18 to 31 |
| $H_2O/YO_2$ | 10 to 70 | 15 to 40 |
| $OH^-/YO_2$ | 0.05 to 0.50 | 0.05 to 0.30 |
| $M/YO_2$ | 0.05 to 3.0 | 0.05 to 1.0 |
| $R/YO_2$ | 0.2 to 1.0 | 0.3 to 0.5 |

In this synthesis method, if more than one X component is present, at least one must be present such that the $YO_2/X_2O_3$ molar ratio thereof is less than about 35. For example, if aluminum oxide and gallium oxide components are used in the reaction mixture, at least one of the $YO_2/Al_2O_3$ and $YO_2/Ga_2O_3$ molar ratios must be less than about 35. If only aluminum oxide has been added to the reaction mixture as a source of X, the $YO_2/Al_2O_3$ ratio must be less than about 35.

In the above synthesis method, the source of $YO_2$ must be comprised predominately of solid $YO_2$, for example at least about 30 wt.% solid $YO_2$ in order to obtain the crystal product of the invention. Where $YO_2$ is silica, the use of a silica source containing at least about 30 wt.% solid silica, e.g. Ultrasil (a precipitated, spray dried silica containing about 90 wt.% silica) or HiSil (a precipitated hydrated $SiO_2$ containing about 87 wt.% silica, about 6 wt.% free $H_2O$ and about 4.5 wt.% bound $H_2O$ of hydration and having a particle size of about 0.02 micron) favors crystalline MCM-49 formation from the above mixture. Preferably, therefore, the $YO_2$, e.g. silica, source contains at least about 30 wt.% solid $YO_2$, e.g. silica, and more preferably at least about 40 wt.% solid $YO_2$, e.g. silica.

Directing agent R may be selected from the group consisting of cycloalkylamine, azacycloalkane, diazacycloalkane, and mixtures thereof, alkyl comprising from 5 to 8 carbon atoms. Non-limiting examples of R include cyclopentylamine, cyclohexylamine, cycloheptylamine, hexamethyleneimine, heptamethyleneimine, homopiperazine, and combinations thereof.

Crystallization of MCM-49 crystalline material can be carried out at either static or stirred conditions in a suitable reactor vessel, such as for example, polypropylene jars or teflon lined or stainless steel autoclaves. The total useful range of temperatures for crystallization is from about 80° C. to about 225° C. for a time sufficient for crystallization to occur at the temperature used, e.g. from about 24 hours to about 60 days. Thereafter, the crystals are separated from the liquid and recovered.

It should be realized that the reaction mixture components can be supplied by more than one source. The reaction mixture can be prepared either batchwise or continuously. Crystal size and crystallization time of MCM-49 crystalline material will vary with the nature of the reaction mixture employed and the crystallization conditions.

Synthesis of MCM-49 may be facilitated by the presence of at least 0.01 percent, preferably 0.10 percent and still more preferably 1 percent, seed crystals (based on total weight) of crystalline product. Useful seed crystals include MCM-22 and/or MCM-49.

The crystals prepared as above for use herein can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

The catalyst described herein can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be introduced in the catalyst composition by way of co-crystallization, exchanged into the composition to the extent a Group IIIA element, e.g., aluminum, is in the structure, impregnated therein or intimately physically admixed therewith. Such component can be impregnated in, or on, the zeolite such as, for example, by, in the case of platinum, treating the zeolite with a solution containing a platinum metal-containing ion. Thus, suitable platinum compounds for this purpose include chloroplatinic acid, platinum halides, and various compounds containing the platinum ammine complex. The presence of a hydrogenation component in the catalyst can facilitate its hydrogenative regeneration.

Zeolite MCM-49, especially in its metal, hydrogen and ammonium forms, can be beneficially converted to another form by thermal treatment. This thermal treatment is generally performed by heating one of these forms at a temperature of at least about 370° C. for at least 1 minute and generally not longer than 20 hours. While subatmospheric pressure can be employed for the thermal treatment, atmospheric pressure is preferred simply for reasons of convenience. The thermal treatment can be performed at a temperature of up to about 925° C.

Prior to its use in a catalytic process, the zeolite MCM-49 crystals may be dehydrated, at least partially. This can be done by heating the crystals to a temperature in the range of from about 200° C. to about 595° C. in an atmosphere such as air, nitrogen, etc., and at atmospheric, subatmospheric or superatmospheric pressures for between about 30 minutes to about 48 hours. Dehydration can also be performed at room temperature merely by placing the crystalline material in a vacuum, but a longer time is required to obtain a sufficient amount of dehydration.

It may be desired to incorporate the MCM-49 with another material resistant to the temperatures and other conditions employed in organic conversion processes. Such materials include active and inactive materials and synthetic or naturally occurring zeolites as well as inorganic materials such as clays, silica, silica-alumina, and/or metal oxides such as alumina, $TiO_2$, or $ZrO_2$. The latter may be either naturally occurring or in the form of gelatinous precipitates or gels including mixtures of silica and metal oxides. Use of a material in conjunction with the new crystal, i.e., combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the-catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present crystal also include inorganic oxides, notably alumina, as well as titania or zirconia.

In addition to the foregoing materials, MCM-49 can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of finely divided crystalline material and inorganic oxide matrix vary widely, with the crystal content ranging from about 1 to about 90 percent by weight and more usually, particularly when the composite is prepared in the form of beads, in the range of about 2 to about 80 weight percent of the composite.

The stability of zeolite MCM-49 may be increased by combining the as-synthesized MCM-49 with an alumina binder, converting the alumina-bound MCM-49 to the hydrogen form, (i.e., HMCM-49) and steaming the alumina-bound HMCM-49 composition under conditions sufficient to increase the stability of the catalyst. U.S. Pat. Nos. 4,663,492; 4,594,146; 4,522,929; and, 4,429,176, the entire disclosures of which are incorporated herein by reference, describe conditions for the steam stabilization of zeolite catalysts which can be utilized to steam-stabilize alumina-bound HMCM- 49. The steam stabilization conditions include contacting the alumina bound HMCM-49 with, e.g., 5–100% steam at a temperature of at least about 300° C. (e.g., 300°–650° C.) for at least one hour (e.g., 1–200 hours) at a pressure of 101–2,500 kPa. In a more particular embodiment, the catalyst can be made to undergo steaming with 75–100% steam at 315°–500° C. and atmospheric pressure for 2–25 hours. In accordance with the steam stabilization treatment described in the above-mentioned patents, the steaming of the catalyst can take place under conditions sufficient to initially increase the Alpha Value of the catalyst, the significance of which is discussed infra, and produce a steamed catalyst having a peak Alpha Value. If desired, steaming can be continued to subsequently reduce the Alpha Value from the peak Alpha Value to an Alpha Value which is substantially the same as or less than the Alpha Value of the unsteamed catalyst.

The alkylation process of this invention is conducted such that the organic reactants, i.e., the alkylatable aromatic compound and the alkylating agent, are brought into contact with the zeolite MCM-49 catalyst composition in a suitable reaction zone such as, for example, in a flow reactor containing a fixed bed of the catalyst composition, under effective alkylation conditions. Such conditions include a temperature of from about 0° C. to about 500° C., and preferably between about 50° C. and about 250° C. The reaction generally takes place at pressures of from about 0.2 to about 250 atmospheres and preferably from about 1 to about 25 atmospheres. The molar ratio of alkylatable aromatic compound to alkylating agent can be from about 0.1:1 to about 50:1 and preferably can be from about 0.5:1 to about 5:1. Reaction is suitably accomplished utilizing a feed weight hourly space velocity (WHSV) of between about 0.1 $hr^{-1}$ and about 500 $hr^{-1}$ and preferably from 0.5 $hr^{-1}$ to about 100 $hr^{-1}$. The latter WHSV is based upon the total weight of active catalyst (and binder if present).

The reactants can be in either the vapor phase or the liquid phase and can be neat, i.e., free from intentional admixture or dilution with other material, or they can be brought into contact with the zeolite catalyst composition with the aid of carrier gases or diluents such as, for example, hydrogen or nitrogen.

The alkylation process described herein can be carried out as a batch-type, semi-continuous or continuous operation utilizing a fixed or moving bed catalyst system. A particular embodiment entails use of a catalyst zone wherein the hydrocarbon charge is passed concurrently or countercurrently through a moving bed of particle-form catalyst. The latter, after use, is conducted to a regeneration zone where coke is burned from the catalyst in an oxygen-containing atmosphere (such as air) at elevated temperature, after which the regenerated catalyst is recycled to the conversion zone for further contact with the organic reactants.

When benzene is alkylated with ethylene to produce ethylbenzene, the alkylation reaction may be carried out in the liquid phase. Suitable liquid phase conditions can be selected by reference to the phase diagram for benzene. In the liquid phase, the reaction is carried out with the benzene feedstock in the liquid phase with the reaction conditions (temperature, pressure) appropriate to this end.

Liquid phase operation may be carried out at temperatures between 300° and 500° F. (about 150° to 260° C.), usually in the range of 400° to 500° F. (about 205° to 260° C.).

Pressures during the liquid phase alkylation step may be as high as about 3000 psig, (about 20875 kPa abs.) and generally will not exceed 1000 psig (about 7000 kPa). The reaction may be carried out in the absence of hydrogen and accordingly the prevailing pressures are those of the reactant species. In a high pressure liquid phase operation, the temperature may be from about 300° to 552° F. (benzene's critical temperature) with the pressure in the range of about 400 to 800 psig. The space velocity may be from about 0.1 to 10 WHSV, based on the ethylene feed, although lower space velocities are preferred for the liquid phase reaction, for example, from about 0.1 to about 1 WHSV with values from about 0.2 to 0.5 WHSV (ethylene) being typical.

When benzene is alkylated with propylene to produce cumene, the reaction may also take place under liquid phase conditions including a temperature of up to about 150° C., e.g., from about 10° C. to about 125° C., a pressure of from about 1 to about 30 atmospheres, and an aromatic hydrocarbon weight hourly space velocity (WHSV) of from 5 $hr^{-1}$ to about 50 $hr^{-1}$.

When conducting alkylation according to the process of this invention, various types of reactors can be used. For example, the process can be carried out in batchwise fashion by adding the catalyst and aromatic feedstock to a stirred autoclave, heating to reaction temperature, and then slowly adding the olefinic or polyalkylaromatic feedstock. A heat transfer fluid can be circulated through the jacket of the autoclave, or a condenser can be provided, to remove the heat of reaction and maintain a constant temperature. Large scale industrial processes may employ a fixed-bed reactor operating in an upflow or downflow mode or a moving-bed reactor operating with concurrent or countercurrent catalyst and hydrocarbon flows. These reactors may contain a single catalyst bed or multiple beds and may be equipped for the interstage addition of olefins and interstage cooling. Interstage olefin addition and more nearly isothermal operation enhance product quality and catalyst life. A moving-bed reactor makes possible the continuous removal of spent catalyst for regeneration and replacement by fresh or regenerated catalysts. The present invention may also be carried out using an ebullated bed reactor or slurry reactor.

In a fixed-bed reactor or moving-bed reactor, alkylation is completed in a relatively short reaction zone following the introduction of olefin.

In order to more fully illustrate the nature of the invention and the manner of practicing same, the following examples are presented.

EXAMPLE 1

1.0 grams (2.0 cc, sized to 1/16"×1/16") of MCM-49 catalyst (containing 35 wt % alumina binder and having an alpha value of 910) was mixed with 10 cc of 20–40 mesh Vycor chips, and then charged into an isothermal tubular reactor. The catalyst was dried at 1 atm. with 50 cc/min of $N_2$ for four hours. The reactor temperature was then adjusted to 129° C. and the reactor pressure was increased to 300 psig before a full range reformate was fed into the reactor at a WHSV of about 17. The full range reformate, obtained from a CCR pilot unit (Continuous Catalytic Reforming), contained 5.475 wt % benzene and had a specific gravity of 0.8075, a research octane number (R+O) of 100.62, and a motor octane number (M+O) of 90.90. The $NN_2$ gas was then cut off. After the catalyst was wetted with the reformated feed, propylene was fed into the reactor at a WHSV of 0.5. The volume of effluent gas was measured by wet test meter. After the system was lined out, a four hour material balance was made, and the results showed that propylene conversion was 81.14%, benzene conversion was 8.51%, liquid yield was 103.31 wt % (102.86 vol %), and the octane number of the liquid product was reduced slightly (delta RON=−0.2, delta MON=−0.7). estimated to be mostly unchanged.

EXAMPLE 2

The alkylation process of Example 1 was continued with all operating conditions remaining the same except that the reaction temperature was raised to 154° C. and propylene was fed into the reactor at a WHSV of 2.26. The results showed that propylene conversion was 96.63 wt %, benzene conversion was 58.20 wt %, liquid yield was 113.29 wt % (112.39 vol %). Delta RON was 0, and delta MON was −0.7.

EXAMPLE 3

The alkylation process of Example 2 was continued with all operating conditions remaining the same except that propylene was fed into the reactor at a WHSV of 2.76. The results showed that propylene conversion was 96.1 wt %, benzene conversion was 68.5 wt %, liquid yield was 116.2 wt % (115.17 vol %). Delta RON was 0, and delta MON was −0.2.

EXAMPLES 4 TO 8

The alkylation process of Example 2 was continued with all operating conditions remaining the same except that the feed set out in Table III containing 4.573 wt % benzene was used, temperature was varied from 154° C. to 348° C., propylene was fed into the reactor at a WHSV of 2.0, reformate WHSV was varied from 16.6 to 17.1, propylene to benzene molar ratio ranged from 4.8 to 4.9. The results, set out in Table III below showed high propylene conversion (97.26 to 99.87 wt %), high benzene conversion (57.11 wt % to 70.21 wt %).

Benzene conversion was shown to improve when alkylation is carried out at temperatures ranging from 225° to 300° C. FIG. 1 shows the % conversion for benzene, toluene, EB/xylenes, and C9 aromatics (excluding cumene which is the major alkylation product derived from benzene). Suppressing the conversion of the existing alkylaromatics in the feed is desirable inasmuch as they are already desirable components of reformate requiring no further alkylation. Maximizing benzene conversion is desirable in order to meet product specifications for low benzene content. The conversion of reformate benzene to cumene by alkylation provides a suitable way to remove benzene while improving liquid yield without adversely affecting octane number.

Figure 2:
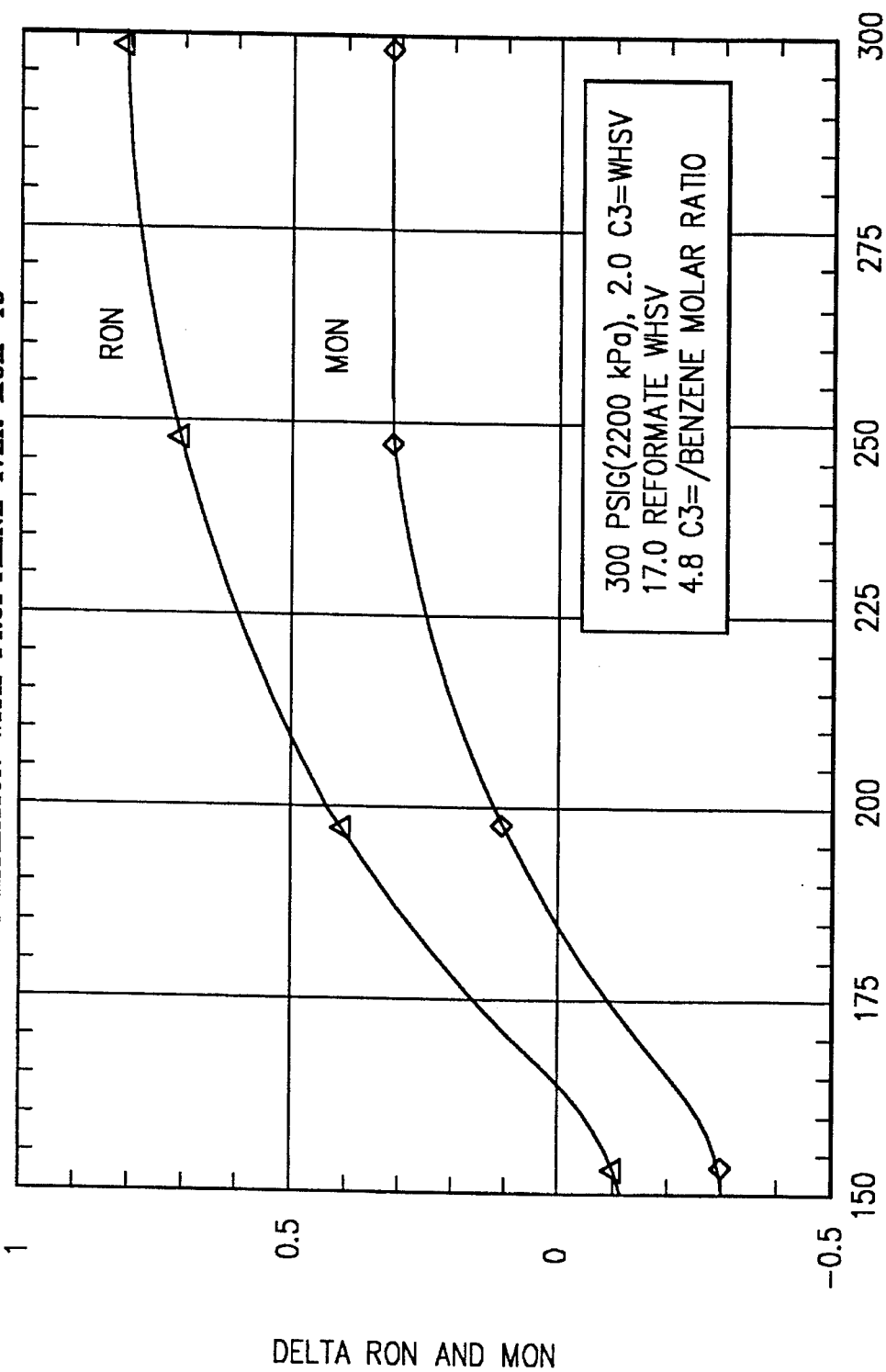
FIG. 2 depicts changes in reformate octane numbers (Delta RON and MON) after alkylation of a full range reformate with propylene over MCM-49 in accordance with the present invention.

FIG. 2 depicts the effect on octane numbers (RON, MON) for the reformate of Examples 4 to 8 treated in accordance with the present invention. A net increase for both RON and MON was observed at temperatures over 185° C.

TABLE III

| | Liquid Phase Reformate/C3= Alkylation Over MCM 49/35% Al2O3 at 300 psig | | | | | |
|---|---|---|---|---|---|---|
| | Feed | Ex. 4 | Ex. 5 | Ex. 6 | Ex. 7 | Ex. 8 |
| TOS, days | | 25.6 | 26.6 | 29.4 | 30.5 | 32.6 |
| Temperature, °C. | | 154.0 | 198.0 | 248.0 | 298.0 | 348.0 |
| C3-WHSV | | 2.00 | 2.00 | 2.00 | 2.00 | 2.00 |
| Reformate WHSV | | 16.6 | 16.9 | 17.0 | 17.0 | 17.1 |
| C3-/Bz molar ratio | | 4.9 | 4.8 | 4.8 | 4.8 | 4.8 |
| Total material balance | | 100.8 | 100.7 | 100.5 | 100.0 | 101.1 |
| Conversion, wt. % | | | | | | |
| C3= | | 99.87 | 99.80 | 97.45 | 97.26 | 98.01 |
| Benzene | | 57.11 | 59.69 | 70.21 | 65.02 | 56.68 |
| Toluene | | 47.18 | 48.22 | 50.99 | 44.77 | 38.83 |
| EB + Xylenes | | 30.79 | 30.89 | 28.55 | 24.88 | 20.20 |
| C9 Ar (minus cumene) | | 18.26 | 17.23 | 14.02 | 12.97 | 7.97 |
| Product Wt % Distribution | | | | | | |
| C1 | 0.000 | 0.000 | 0.000 | 0.000 | 0.000 | 0.000 |
| C2= | 0.000 | 0.000 | 0.000 | 0.000 | 0.000 | 0.000 |
| C2 | 0.006 | 0.006 | 0.006 | 0.006 | 0.006 | 0.009 |
| C3=/C3 | 0.182 | 0.386 | 0.253 | 0.302 | 0.648 | 1.613 |
| I-C4 | 0.381 | 0.367 | 0.373 | 0.503 | 0.709 | 0.705 |
| i-C4=/1-C4= | 0.007 | 0.000 | 0.000 | 0.000 | 0.000 | 0.044 |
| n-C4 | 0.618 | 0.591 | 0.580 | 0.616 | 0.601 | 0.598 |
| t-C4= | 0.000 | 0.000 | 0.000 | 0.000 | 0.000 | 0.023 |
| c-C4= | 0.000 | 0.000 | 0.000 | 0.000 | 0.000 | 0.000 |
| 1-C5 | 1.344 | 1.281 | 1.272 | 1.439 | 1.472 | 1.396 |
| 1-C5= | 0.000 | 0.000 | 0.000 | 0.000 | 0.000 | 0.000 |
| 2-M-1-C4= | 0.000 | 0.000 | 0.000 | 0.000 | 0.000 | 0.000 |
| n-C5 | 0.995 | 0.934 | 0.917 | 0.970 | 0.929 | 0.903 |
| t-2-C5= | 0.009 | 0.008 | 0.000 | 0.000 | 0.000 | 0.013 |
| c-2-C5=/2-M-2-C4= | 0.005 | 0.000 | 0.000 | 0.000 | 0.000 | 0.056 |
| 2,2-BM-C4 | 0.542 | 0.511 | 0.502 | 0.527 | 0.519 | 0.490 |
| c-C5=/4-M-1-C5= | 0.018 | 0.000 | 0.000 | 0.000 | 0.000 | 0.010 |
| c-C5/2,3-DM-C4 | 0.781 | 0.737 | 0.731 | 0.795 | 0.822 | 0.834 |
| 2-M-C5 | 2.441 | 2.318 | 2.280 | 2.425 | 2.378 | 2.258 |
| 3-M-C5 | 1.895 | 1.790 | 1.779 | 1.896 | 1.852 | 1.762 |
| 2-M-1-C5= | 0.031 | 0.013 | 0.000 | 0.000 | 0.000 | 0.032 |
| n-C6 | 2.369 | 2.216 | 2.174 | 2.279 | 2.198 | 2.121 |
| C6=,Σ | 0.125 | 0.099 | 0.005 | 0.000 | 0.000 | 0.147 |
| M-c-C5 | 0.286 | 0.270 | 0.252 | 0.219 | 0.207 | 0.242 |
| C7P (others), Σ | 3.963 | 3.561 | 3.465 | 3.602 | 3.429 | 3.569 |
| Bz | 4.573 | 1.737 | 1.636 | 1.215 | 1.436 | 1.758 |
| c-C6 | 0.000 | 0.000 | 0.000 | 0.000 | 0.000 | 0.000 |
| n-C7 | 1.049 | 0.972 | 0.939 | 0.978 | 0.952 | 0.926 |
| Tol | 15.100 | 7.063 | 6.940 | 6.603 | 7.485 | 8.197 |
| C8P (others), Σ | 1.149 | 1.101 | 1.095 | 1.083 | 1.122 | 1.027 |
| n-C8 | 0.333 | 0.305 | 0.301 | 0.298 | 0.296 | 0.301 |
| EB | 3.798 | 2.775 | 2.660 | 2.383 | 1.993 | 2.461 |
| m-, p-Xyl | 13.549 | 9.151 | 9.171 | 9.902 | 10.438 | 10.763 |
| o-Xyl | 5.696 | 2.195 | 2.306 | 2.405 | 3.105 | 3.092 |
| C9P (others), Σ | 0.620 | 0.803 | 0.536 | 0.447 | 0.412 | 0.424 |
| n-C9 | 0.127 | 0.134 | 0.129 | 0.117 | 0.109 | 0.116 |
| Cumene | 0.457 | 3.743 | 3.542 | 3.814 | 3.346 | 3.185 |
| n-C3-Bz | 1.571 | 1.211 | 1.181 | 1.089 | 0.916 | 1.157 |
| m-, p-Et-Tol | 6.872 | 5.465 | 5.467 | 5.442 | 5.474 | 5.795 |
| 1,3,5-TMB | 2.165 | 1.898 | 1.928 | 1.951 | 2.082 | 2.008 |
| o-Et-Tol | 1.775 | 1.258 | 1.239 | 1.130 | 0.889 | 1.130 |
| 1,2,4-TMB | 7.526 | 4.858 | 5.082 | 5.912 | 6.428 | 6.415 |
| i-C4-Bz/sec-C4-Bz | 0.349 | 0.284 | 0.287 | 0.265 | 0.163 | 0.255 |
| 1,2,3-TMB (est.) | 1.012 | 0.653 | 0.684 | 0.795 | 0.865 | 0.863 |
| m-Cymene (est.) | 0.895 | 2.055 | 2.354 | 4.852 | 5.500 | 4.077 |
| p-, o-Cymene | 0.125 | 7.695 | 7.048 | 5.003 | 3.110 | 3.460 |
| indane | 0.568 | 0.212 | 0.208 | 0.167 | 0.130 | 0.181 |
| Other C10 Ar, Σ | 10.088 | 9.428 | 9.864 | 10.771 | 12.695 | 11.092 |

TABLE III-continued

Liquid Phase Reformate/C3= Alkylation Over MCM 49/35% Al2O3 at 300 psig

|  | Feed | Ex. 4 | Ex. 5 | Ex. 6 | Ex. 7 | Ex. 8 |
|---|---|---|---|---|---|---|
| Naphthalene | 0.947 | 0.436 | 0.459 | 0.359 | 0.263 | 0.272 |
| C11–C12 Ar, Σ | 2.032 | 16.292 | 16.544 | 14.048 | 11.351 | 10.614 |
| 2-M-Naph | 0.701 | 0.459 | 0.515 | 0.405 | 0.319 | 0.356 |
| 1-M-Naph | 0.355 | 0.271 | 0.283 | 0.247 | 0.137 | 0.183 |
| DM-Naph,Σ | 0.355 | 1.771 | 1.995 | 1.643 | 1.345 | 1.595 |
| C13+ | 0.211 | 0.685 | 1.019 | 1.098 | 1.869 | 1.471 |
| Σ | 100.000 | 100.000 | 100.000 | 100.000 | 100.000 | 100.000 |

What is claimed is:

1. A process for alkylating a reformate feedstream containing benzene, toluene, xylenes, and ethylbenzene, said process comprising:

1) contacting said reformate feedstream with a hydrocarbon stream comprising $C_2$–$C_5$ olefins in the presence of a catalyst comprising an active form of synthetic porous crystalline MCM-49 under benzene alkylation conditions whereby an effluent stream is produced having a benzene content at least 50 wt % less than that of said feedstream, an octane rating no less than that of said feedstream, and a total liquid product greater than that of said feedstream; and 2) collecting the gasoline boiling range fraction of said effluent stream.

2. The process of claim 1 wherein said alkylation conditions comprise at least partial liquid phase operation, said $C_2$–$C_5$ olefins being in gaseous phase, comprising temperatures of 150° to 350° C., pressures of 50 to 1000 psig, a benzene to olefin molar ratio of 0.1 to 0.9, an aromatics to olefin molar ratio of 0.1 to 10, and feed WHSV of between 0.1 $hr^{-1}$ and 500 $hr^{-1}$, and said reformate is a full range reformate.

3. The process of claim 1 wherein said hydrocarbon stream comprising $C_2$–$C_5$ olefins contains at least 30 wt % propylene and said benzene alkylation conditions comprise temperature between 200° and 300° C., pressure between 100 and 500 psig, and weight hourly space velocity between 0.5 $hr^{-1}$ to about 100 $hr^{-1}$.

4. The process of claim 3 wherein said hydrocarbon stream comprising $C_2$–$C_5$ olefins contains at least 40 wt % propylene and said reformate feedstream is a full range reformate (C5 to 450° F.).

5. The process of claim 1 wherein said catalyst bed comprises a fixed-bed.

6. The process of claim 1 wherein the synthetic porous crystalline MCM-49 has a composition comprising the molar relationship $$X_2O_3:(n) YO_2$$

wherein n is less than about 35, X is a trivalent element and Y is a tetravalent element.

7. The process of claim 6 wherein n is from about 10 to less than about 35.

8. The process of claim 6 wherein X is a trivalent element selected from the group consisting of aluminum, boron, iron, gallium, and mixtures thereof, and Y is a tetravalent element selected from the group consisting of silicon, titanium, germanium, and mixtures thereof.

9. The process of claim 6 wherein X comprises aluminum and Y comprises silicon.

10. The process of claim 1 wherein said synthetic porous crystalline MCM-49 has been treated to replace original cations, at least in part, with a cation or mixture of cations selected from the group consisting of hydrogen, hydrogen precursors, rare earth metals, and metals of Groups IIA, IIIA, IVA, IB, IIB, IIIB, IVB, VIB and VIII of the Periodic Table.

11. The process of claim 1 wherein said MCM-49 is in the hydrogen form.

12. The process of claim 1 wherein said catalyst comprises an inorganic oxide binder.

13. The process of claim 12 wherein said binder is selected from the group consisting of alumina, silica, silica-alumina, titania and zirconia.

14. The process of claim 1 which further comprises 3) blending said gasoline boiling range fraction with a non-reformate gasoline boiling range fraction to provide a gasoline boiling range product containing no greater than 1 vol % benzene.

15. A process for reducing benzene content in a benzene-containing full range reformate feed while enhancing octane number (RON) by at least 0.5 which comprises 1) contacting said feed with a hydrocarbon stream comprising $C_2$–$C_5$ olefins in the presence of a catalyst comprising an active form of synthetic porous crystalline MCM-49 under benzene alkylation conditions including a temperature ranging from 215° to 300° C.; and 2) collecting the gasoline boiling range fraction of said effluent stream.

* * * * *